United States Patent [19]
Maltsev et al.

US005777309A

[11] Patent Number: 5,777,309
[45] Date of Patent: Jul. 7, 1998

[54] METHOD AND APPARATUS FOR LOCATING AND DECODING MACHINE-READABLE SYMBOLS

[75] Inventors: Pavel A. Maltsev, Edmonds; H. Sprague Ackley, Seattle, both of Wash.

[73] Assignee: Intermec Corporation, Everett, Wash.

[21] Appl. No.: 549,916

[22] Filed: Oct. 30, 1995

[51] Int. Cl.$^6$ .................................................. G06K 7/10
[52] U.S. Cl. .......................... 235/462; 235/462; 235/463; 235/454; 235/494
[58] Field of Search ................................ 235/462, 463, 235/454, 494

[56] References Cited

U.S. PATENT DOCUMENTS

| | | | |
|---|---|---|---|
| 1,985,035 | 12/1934 | Kermode et al. | 209/111 |
| 2,612,994 | 10/1952 | Woodland et al. | 209/111 |
| 3,359,405 | 12/1967 | Sundblad | |
| 3,622,758 | 11/1971 | Schanne | |
| 3,784,792 | 1/1974 | Dobras | |
| 3,909,594 | 9/1975 | Allais et al. | |
| 4,013,893 | 3/1977 | Hertig | 250/568 |
| 4,056,710 | 11/1977 | Shepardson et al. | 235/437 |
| 4,335,301 | 6/1982 | Palmer et al. | 235/462 |
| 4,379,224 | 4/1983 | Engstrom | 235/463 |
| 4,687,942 | 8/1987 | Takagi et al. | 250/556 |
| 4,916,298 | 4/1990 | Raphaël | 235/463 |
| 4,980,544 | 12/1990 | Winter | 235/436 |
| 5,080,456 | 1/1992 | Katz et al. | 359/214 |
| 5,097,263 | 3/1992 | Delpech et al. | 241/155 |
| 5,155,343 | 10/1992 | Chandler et al. | 235/462 |
| 5,155,344 | 10/1992 | Fardeau | 235/462 |
| 5,231,293 | 7/1993 | Longacre, Jr. | 250/568 |
| 5,268,562 | 12/1993 | Lazaridis | 235/462 |
| 5,276,315 | 1/1994 | Surka | 235/462 |
| 5,311,001 | 5/1994 | Joseph et al. | 235/462 |
| 5,352,878 | 10/1994 | Smith et al. | 235/462 |
| 5,376,780 | 12/1994 | Klueter | 235/462 |
| 5,389,770 | 2/1995 | Ackley | 235/462 |
| 5,412,196 | 5/1995 | Surka | 235/462 |
| 5,504,318 | 4/1996 | Joseph et al. | 235/462 |

FOREIGN PATENT DOCUMENTS

| | | |
|---|---|---|
| 0 262 924 | 4/1988 | European Pat. Off. |
| 0 385 783 | 9/1990 | European Pat. Off. |
| WO 88/02521 | 4/1988 | WIPO |

OTHER PUBLICATIONS

"Report on Unsymmetrical Signals in the Supermarket Scanner," interoffice memorandum, Intermec Corporation, Everett, WA, Jan. 21, 1970.

"Verification—New Insight for an Old Debate," Scan-Tech '87, interoffice memorandum, Intermec Corporation, Everett, WA, Oct. 13, 1987.

Barkan, Eric and David Sklar, Effects of substrate scattering on bar-code scanning signals, *SPIE* 362:196–212, 1982.

*Bar Code Print Quality—Guideline*, American National Standards Institute, New York, NY, 190, pp. 1–29.

Barkan, Eric and Jerome Swartz, "Depth of modulation and spot size selection in bar code laser scanners," in *Proceedings of SPIE's 25th Annual International Technical Symposium and Exhibit*, Int'l. Society for Optical Engineering, San Diego, CA, Aug. 24–28, 1981.

*Primary Examiner*—Harold Pitts
*Attorney, Agent, or Firm*—Seed and Berry LLP

[57] ABSTRACT

A method and apparatus for locating and decoding machine-readable symbols is provided. In a preferred embodiment, an image of the symbol is stored and a sampling path through the stored image is selected. The sampling path represents a reflectance signal profile formed through the symbol. Characteristic or critical points are selected along the profile, including minimum and maximum points of peaks and valleys in the profile. Distances between the centers of peaks and valleys are determined. The present invention locates a defined portion of the symbol, such as a finder pattern, by locating a predetermined series of measured distances, such as a series of adjacent, substantially equal distances. After having located the finder pattern, the present invention determines the location of the symbol within the stored image, and thereafter decodes the symbol.

24 Claims, 14 Drawing Sheets

METHOD AND APPARATUS FOR LOCATING AND DECODING MACHINE-READABLE SYMBOLS

TECHNICAL FIELD

The present invention relates to methods and apparatus for locating and decoding machine-readable symbols.

BACKGROUND OF THE INVENTION

Bar code readers locate and decode typical bar codes from linear symbologies. "Linear symbologies" are symbologies where data is encoded as parallel arrangements of alternating, multiple-width bars and spaces (e.g., U.P.C., Code 39, Code 93, etc.). Linear symbologies, as well as other symbologies, encode "data characters" (i.e., human-readable characters) as "symbol characters," which are typically alternating bars and spaces.

Bar code readers typically convert symbol characters to data characters by scanning or imaging an area to produce a reflectance signal or bar code "profile" that is generally an analog signal representing the modulated light reflected from areas of high reflectance or "spaces," and absorbed by areas of low reflectance or "bars." As a result, the profile represents the pattern of bars and spaces in the symbol. In a given profile, a peak corresponds to a space (high reflectivity), while a valley corresponds to a bar (low reflectivity, relative to the space). The width of each peak or valley generally indicates the width of the corresponding bar or space whose reflectance produced the peak or valley.

Many bar code readers employ "wave shaping" circuits that essentially square off the profile based on transitions or vertical edges between the peaks and valleys in the profile. Counting circuits then produce a series of counts that indicate the horizontal widths of the bars and spaces for linear bar code symbols. A locating algorithm in the reader locates a bar code symbol by examining the series of counts to attempt to find a quiet zone and an adjacent start/stop symbol character. A "quiet zone" is a clear space, containing no dark marks, that precedes or follows a symbol, often next to a start or stop character. "Start and stop characters" are symbol characters, unique to a given symbology, that indicate the beginning and end of a given symbol, respectively. Typically, a quiet zone has a size that is about ten times greater than bars that precede or follow the quiet zone. Therefore, the reader examines a series of counts and attempts to find a count that is approximately ten times greater than a count which follows thereafter. Once the quiet zone and adjacent start/stop character have been located, standard decode algorithms are employed to decode series of counts from the symbol into data characters.

Newer data collection symbologies have departed from the typical linear symbologies to create stacked or area symbologies in order to increase "information density," i.e., the amount of information encoded within a given area. "Stacked symbologies," or multi-row symbologies, employ several adjacent rows of multiple-width bars and spaces (e.g., Code 49, PDF417, etc.). "Area symbologies" or two-dimensional matrix symbologies, employ arrangements of regular polygon-shaped data cells where the center-to-center distance of adjacent data cells is uniform (e.g., MaxiCode, Code One, Data Matrix, Aztec Code, etc.).

While standard locating and decode algorithms can be used for linear symbologies, and for some stacked symbologies, such algorithms are unsuitable for area symbologies. For example, the MaxiCode symbology employs a two-dimensional matrix of adjacent, regular hexagons with a central bull's-eye pattern of black and white concentric circular rings. A related symbology, Aztec Code, employs a two-dimensional matrix of adjacent squares with a central bull's-eye pattern of black and white concentric square rings. Since the finder pattern is located within the middle of the matrix of data cells, and not adjacent to the quiet zone, standard locating algorithms cannot search through a series of counts for an extremely large count adjacent to a much smaller count to locate the center finder pattern.

Instead, the MaxiCode symbology employs a sophisticated fast fourier transform ("FFT") method to locate the finder pattern within the two-dimensional matrix of hexagonal data cells. The method converts a series of profiles taken from the symbol from the spatial domain to the frequency domain to locate the centers of the hexagonal data cells. The method then converts the frequency data back to the spatial domain to locate the outlines or outer boundaries of the hexagonal data cells. Thereafter, the method locates the central bull's-eye pattern and six sets of three data cells positioned about the bull's-eye pattern to determine the center and orientation of the symbol. More detail regarding the method can be found in the MaxiCode AIM Uniform Symbology Specification.

The above FFT method requires a substantial amount of memory capacity during the locating process for a given symbol. Additionally, the method requires a significant amount of processing overhead, often requiring a fast microprocessor. Fast microprocessors are typically more expensive than their slower counterparts, and therefore, readers designed to locate and decode MaxiCode symbols are expensive. Additionally, when a given MaxiCode symbol suffers from printing defects such as spots or voids, is slightly out of focus, or the profile produced from the symbol has noise, the effectiveness of the FFT method in locating the central bull's-eye pattern substantially decreases.

SUMMARY OF THE INVENTION

As represented in the claims below, the present invention, in a broad sense, embodies a method of locating and decoding a data collection, machine-readable symbol representing encoded information. The symbol includes a plurality of selectively spaced two-dimensional geometric shapes, the shapes and spaces between the shapes having at least a first width in at least one dimension. The symbol has a predetermined location pattern of shapes and spaces.

The method includes the steps of: (a) producing a reflectance signal based on light reflected from the symbol, the reflectance signal having valleys and peaks that represent the reflectance of the shapes and spaces, respectively; (b) identifying a plurality of portions in the reflectance signal that correspond to the valleys and peaks of the shapes and spaces; (c) measuring distances between the plurality of portions in the reflectance signal; (d) identifying the predetermined location pattern based on the measured distances in the reflecting signal; (e) determining an orientation of the symbol based on the identified predetermined location patterns; and (f) decoding the information encoded in the symbol based on the orientation of the symbol.

Similarly, the present invention embodies an apparatus for locating a machine-readable symbol. The machine-readable symbol includes a plurality of relatively spaced two-dimensional shapes, and having a selected pattern of shapes and spaces between the shapes. The apparatus includes a sensor that receives light that is reflected from the machine-readable symbol, and produces an output signal therefrom that represents the reflectance of the shapes and spaces comprising the symbol. A receiver receives the output signal and produces a reflectance signal that indicates at least some of the shapes and spaces.

The apparatus further includes a processor for processing the reflectance signal and producing a signal indicative of the information encoded in the symbol. The processor (i) identifies a plurality of portions in the reflectance signal that correspond to at least portions of the shapes and spaces represented in the reflectance signal, (ii) measures distances between the plurality of portions in the reflectance signal, (iii) identifies the selected pattern based on the measured distances in the reflectance signal, and (iv) determines an orientation of the symbol based on the identified selected pattern.

Other features and associated advantages of the present invention will become apparent from studying the following detailed description, together with the accompanying drawings.

DETAILED DESCRIPTION OF PRESENTLY PREFERRED EMBODIMENT OF THE INVENTION

Figure 1:
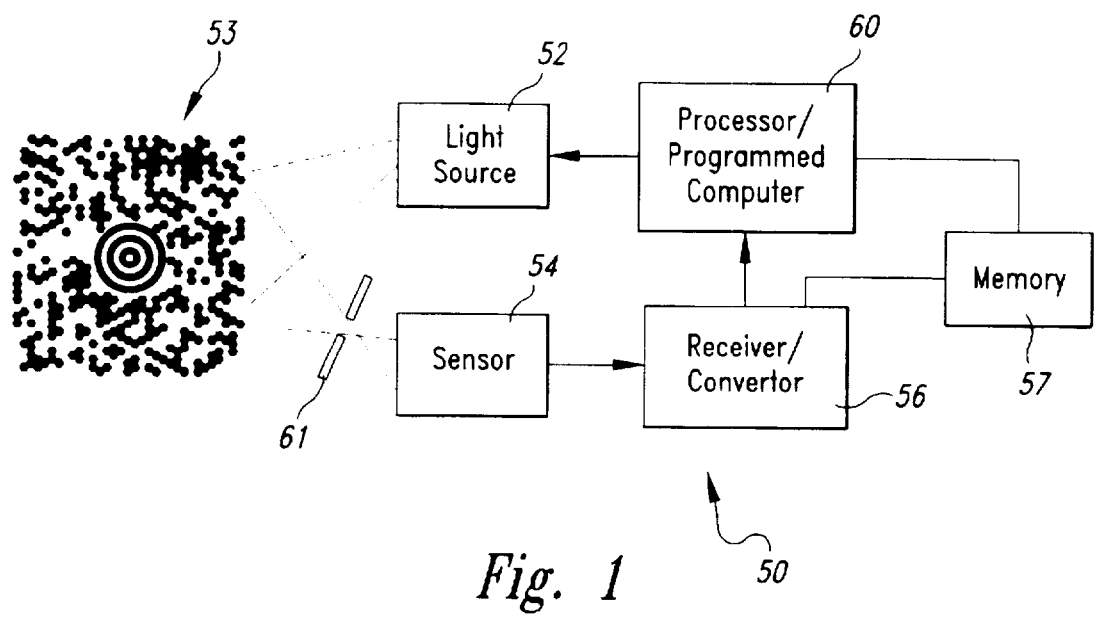
FIG. 1 is a block diagram of a preferred data collection symbology reader of the present invention with a plan view of a MaxiCode symbol.
Figure 16:
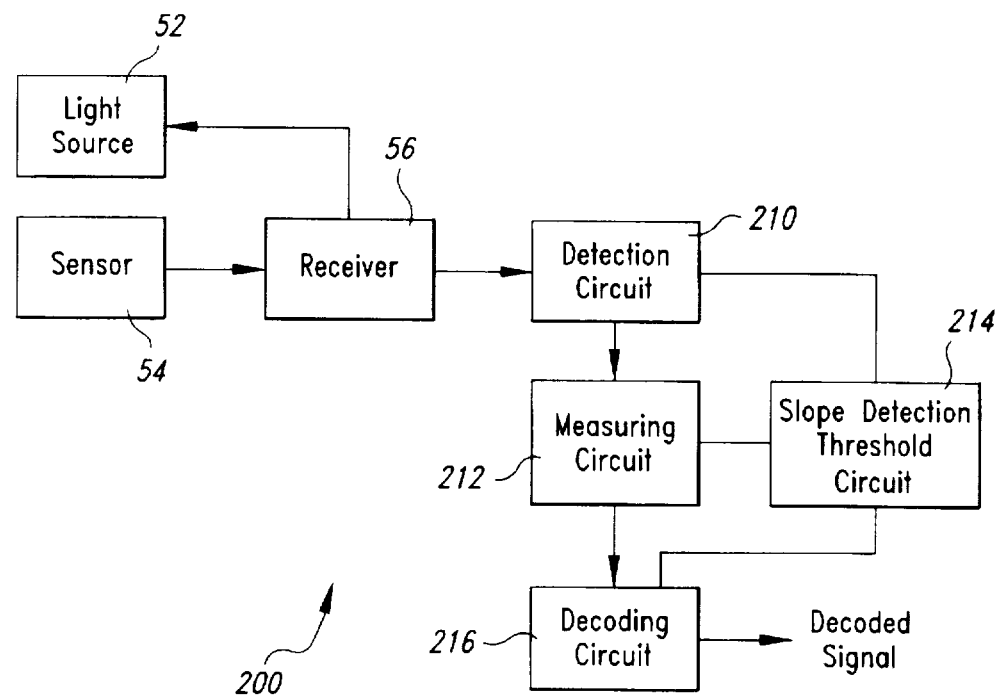
FIG. 16 is a block diagram of an alternative data collection symbology reader under the present invention.
Figure 2:
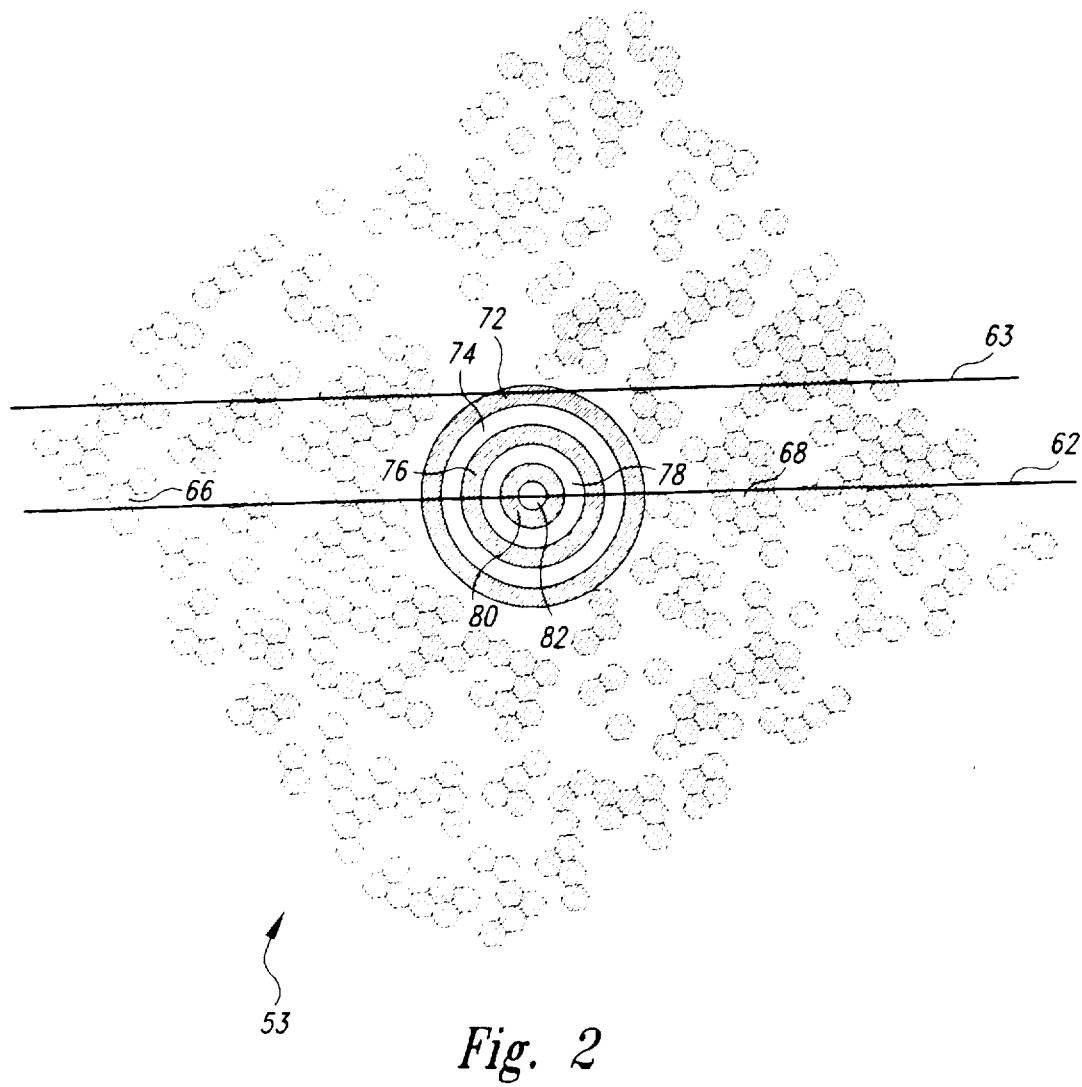
FIG. 2 is an enlarged plan view of the MaxiCode symbol of FIG. 1, showing an example of a sampling path formed through the symbol such as by the reader of FIG. 1.

As shown in FIG. 1, a data collection symbology reader 50 of the present invention includes a light source 52 that illuminates a data collection or other symbol, such as a MaxiCode symbol 53 (shown more clearly in FIG. 2). As used herein, a "data collection symbol" refers to a symbol from any linear, stacked, area or other machine-readable symbology. A sensor 54 having an optical aperture 61, receives light reflected from the symbol 53 and converts the received light into an electrical signal or profile. For example, the light source 52 can be a rasterizing laser, while the sensor 54, in turn, can be a photodetector. Alternatively, the light source 52 can be an LED, flashbulb, infrared light source, or other light-emitting element, while the sensor 54 can be a one or two dimensional CCD, semiconductor array, vidicon, or other area imager capable of converting received light into electrical signals.

A receiver or converter 56 receives the electrical signal from the sensor 54 and converts into a signal to be processed by a programmed computer or processor 60. Typically, the sensor 54 produces an analog profile signal that represents the modulated light reflected from the elements in the symbol 53. Importantly, if the processor 60 is a digital computer, then the converter 56 converts the profile from an analog signal produced by the sensor 54 to a multi-level digital profile signal that numerically represents the various amplitudes of the analog signal. The converter 56 and/or processor 60 are coupled to memory 57 for storing the profile in digital form. The converter 56, memory 57 and processor 60 can be monolithically integrated.

The sensor 54 preferably is a charge-coupled device ("CCD") or similar area imager having a active surface such as a rectangular surface of M by N pixel elements, e.g., 582 by 752 pixel elements. As is known, each pixel element in the CCD array of the sensor typically outputs a gray level signal, i.e., an analog signal that determines the amount or intensity of light impinging upon the particular pixel element, similar to a video data signal. The converter 56 preferably converts the gray level signal into a digital signal having, for example, 16 levels of gray for use by the processor 60. The memory 57 stores the digital signals, and preferably includes both volatile and non-volatile memory (e.g., random access and electrically, erasable read-only memory). As a result the reader 50 allows an object or image within the field of view of the sensor 54 to be converted into electrical signals that are digitized and stored as a stored image in the random access portion memory 57 to be retrieved and processed by the processor 60 under a routine 100 stored in the read-only memory (as described below). After processing the stored image, the processor 60 can output the results of such processing to a peripheral apparatus or a computer (not shown).

Figure 3:
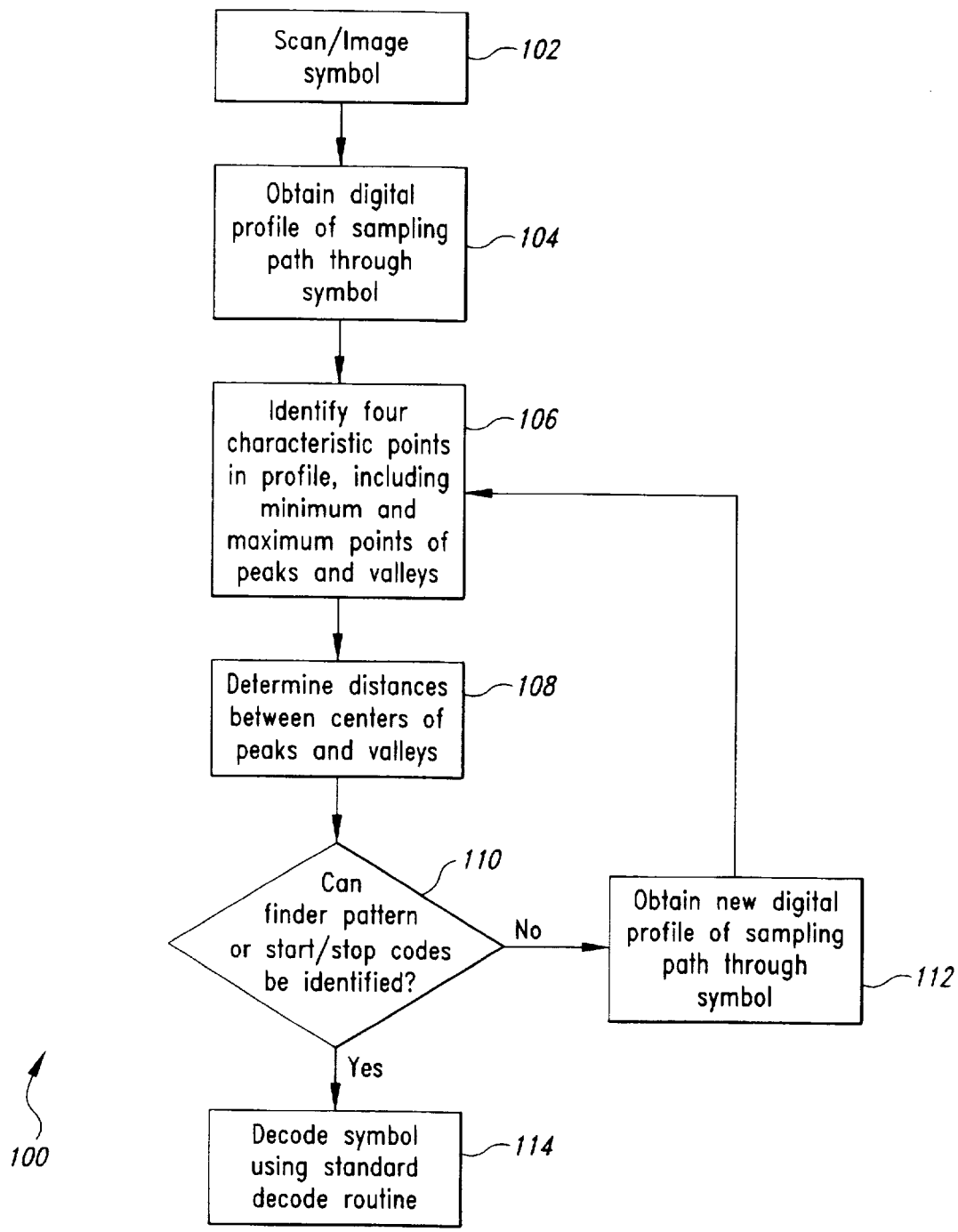
FIG. 3 is a flowchart that shows a preferred method of locating and decoding data collection symbols, including the symbol of FIG. 2.

Referring to FIG. 3, the preferred routine 100 performed by the reader 50 of the present invention first locates the image of the symbol 53 within a stored image, and then decodes the symbol. As used herein, the term "stored image" generally refers to the overall image of the field of view stored in the memory 57 that has been produced by the sensor 54 and the processor 60, and which contains the symbol 53 or other symbols to be decoded. For processing efficiency, if the CCD in the sensor 54 has an array of 582 by 752 pixels, then the memory 57 includes a 582 by 752 array of memory locations addressed by the processor 60 that correspond to the array of pixels. The stored image in the memory 57 is preferably referenced by a Cartesian coordinate system so that the location of each pixel is represented by a pair of numbers indicating the horizontal and vertical position of the pixel in the stored image. For example, the first pixel in the top left corner of the stored image is assigned the Cartesian coordinates (0, 0), while the bottom right-most pixel is assigned the coordinates (752, 582). Therefore, objects within the stored image, i.e., groups of pixels, can be arithmetically located using known geometric and trigonometric properties based on the coordinate system (e.g., equations of lines, circles, or other geometric or trigonometric equations used for representing planar objects). As used herein, the term "locates" generally refers to determining both the position and orientation of the image of an object within the stored image.

The routine 100 begins in step 102 where the reader scans or stores an image of the symbol 53. For example, the reader 50 can be a hand-held product and include a trigger switch (not shown) coupled to the processor 60 that causes the light source 52 to illuminate the symbol 53, and allow the sensor 54, converter 56 and processor 60 to store an image of the symbol in the memory 57 upon actuation of the switch. The specific means and method for storing an image of a symbol by the reader 50 are conventional and will be understood by those skilled in the relevant art without need for further description herein.

In step 104, the processor 60 begins to locate the symbol 53 within the stored image. As noted above, the sensor 54 is preferably an area image such as a CCD, and therefore, the processor 60 in step 104 initially analyzes a virtual scan or sampling path 62 taken through preferably a middle of the stored image, and in the case of the path 62, through the symbol 53. If the sensor 54 is a photodetector, while the light source 52 is a rasterizing laser, then the processor 60 analyzes a profile that is generated from a scan line through the symbol 53 similar to the path 62. The processor 60 either converts the sampling path 62 to a digital profile of a portion of the symbol 53, or preferably, the converter 56 has previously converted the analog profile from the sensor 54 into a digital profile that is stored in the memory 57 for direct processing by the processor 60, without the need for the processor to perform additional steps. In other words, the processor 60 simply selects a row (or column) of memory cells in the memory 57 that correspond to a row (or column) of digitized pixels from the stored image or field of view, and analyzes the selected row as a digital profile. As a result, the terms "profile," "row of pixels," and "sampling path" are at times used interchangeably herein.

Figure 4:
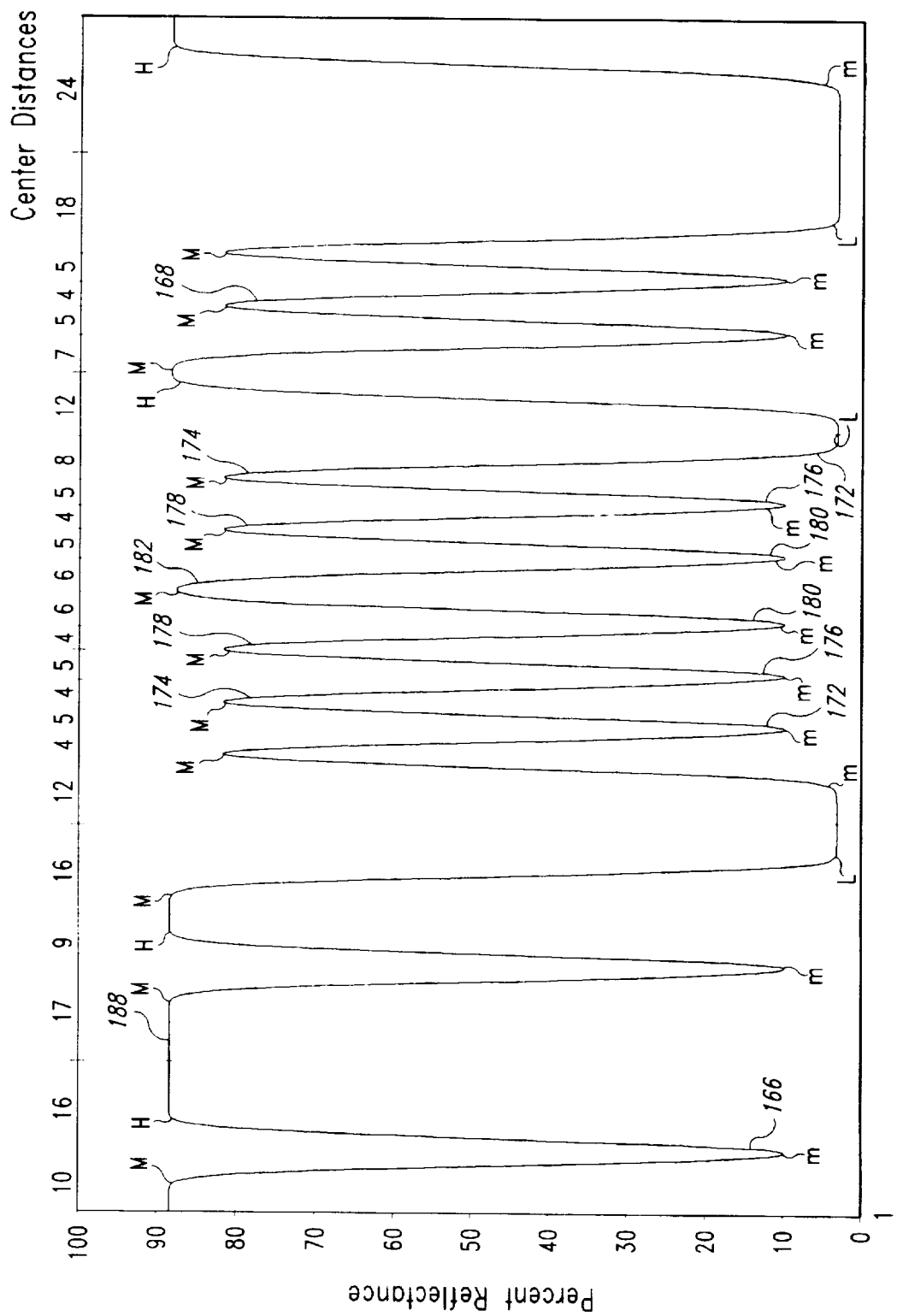
FIG. 4 is an example of a continuous profile taken along the sampling path of the symbol of FIG. 2, as produced by the reader of FIG. 1 having an aperture of 0.8 times the X-dimension of the symbol.

Referring to FIG. 4, an exemplary profile produced from the sampling path 62 is shown as having a continuous waveform. The profile of FIGS. 4 has a vertical scale that represents a percent reflectance of light received from the symbol 53 ranging from 0% to 100%. The horizontal scale is not known absolutely, but rather it is in relative units, such as a distance across the symbol 53 or time allotted during the sampling path 62. When decoding a profile from a symbol, it is unnecessary to know the horizontal spacing in measurement units, but rather to know the relative widths or distances between elements represented by peaks or valleys in the profile. In general, an "element" is a single dark shape or a single space in a symbology. In the MaxiCode symbology, each element or data cell in the symbol is a single, uniform size, dark hexagonal shape or a white hexagonal space. In typical linear symbologies, such as Code 39, each element in the symbol is one of four narrow and wide elements: a single-width bar, a single-width space, a double-width bar or a double-width space. More complex linear or stack symbologies employ a greater number of widths for each element.

Figure 5A:
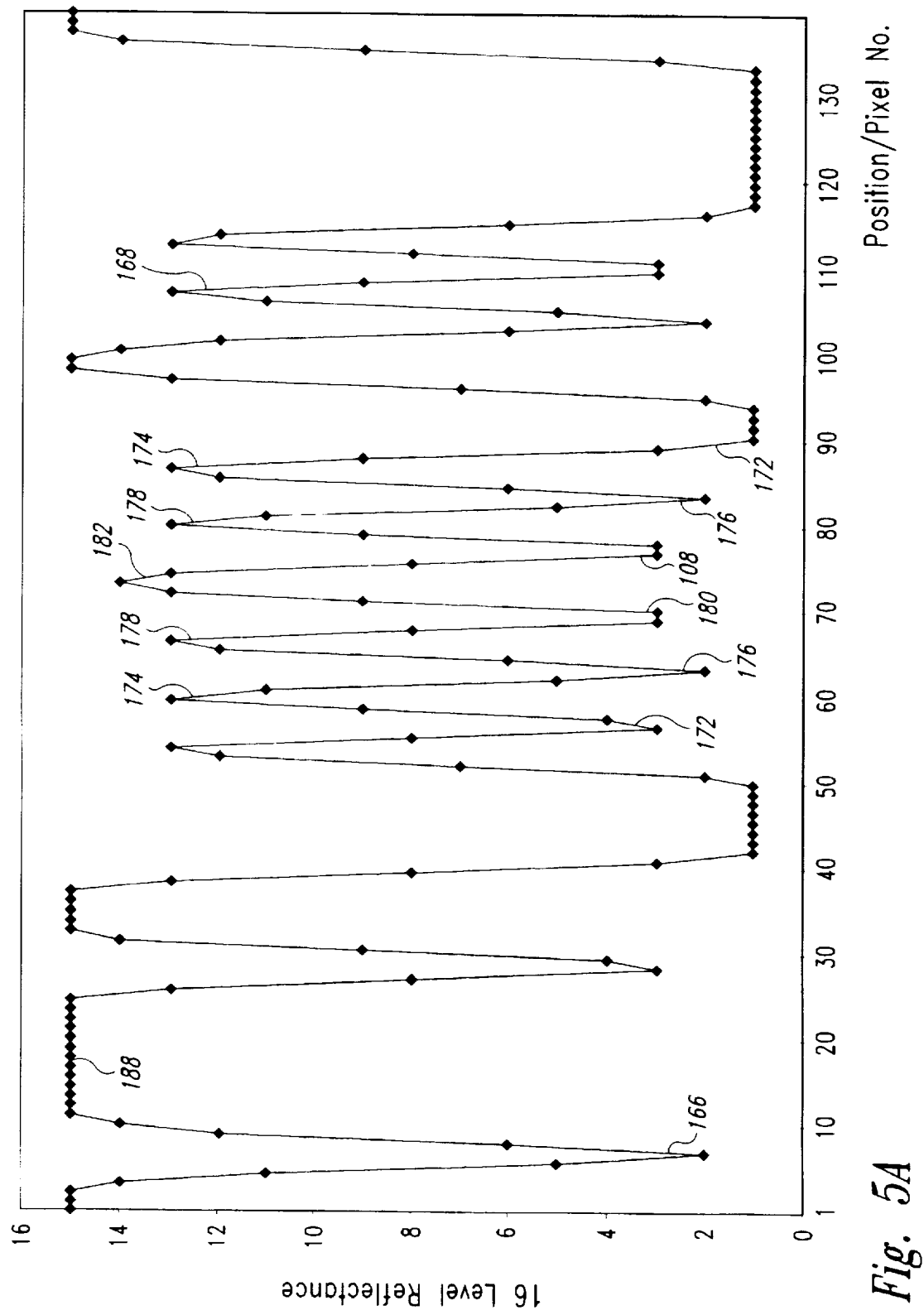
FIGS. 5A and 5B are examples of digital profiles generated from the sampling path of the symbol of FIG. 2, as produced by the reader of FIG. 1 having an aperture of approximately 0.8 times the X-dimension of the symbol and that is based on a conversion to 16 levels of gray and a resolution of 2.4 pixels per module for the symbol.

If the converter 56 of the reader 50 converts the field of view into 16 levels of gray, then the profile of FIG. 5A, having a less smooth, and more jagged and discontinuous, profile is shown as would typically be produced by the reader 50. The jaggedness in the profile of FIG. 5A is also due to the fact that a finite number of pixels were used to image the sampling path 62 through the symbol 53. Each "jag" is the result of plotting the reflectance value of one pixel. The vertical scale shows the 16 levels of reflectance from zero or black to 16 or white. The horizontal scale represents a position along the profile, or more particularly, the number of individual pixel elements in a series of pixel elements from which data is sampled.

The profile of FIG. 5A is an example of a profile generated by a CCD type reader 50 having a beta of 2.4. "Beta" is a ratio of the number of pixels to the number of modules used to image a symbol. A "module" is the narrowest nominal width of measure in a bar code symbology. A module is therefore generally equal to the X- dimension. The sampling path 62 passes through approximately 57 modules, and approximately 138 pixels are used to sample the sampling path, and therefore the profile the profile of FIG. 5A represents a beta of 2.4.

Figure 5B:
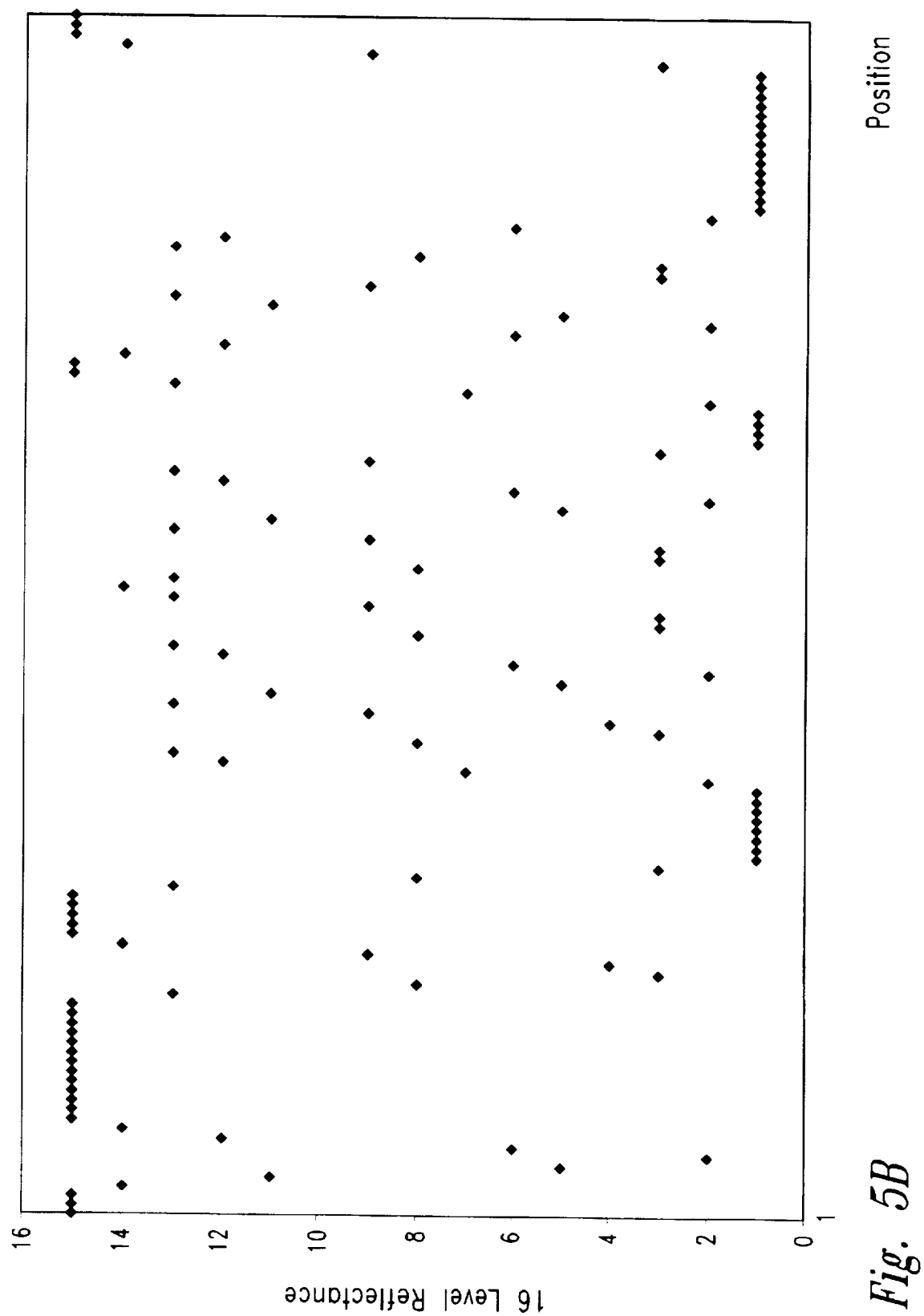

Each pixel in the profile of FIG. 5A is shown as a dot, and for visual purposes, the profile is shown as a line interconnecting the dots. The profile of FIG. 5B, however, is a more accurate representation of an actual profile processed by the processor 60. The processor 60, as described more fully below, analyzes a reflectance value of each pixel in the series of pixel elements, where each pixel can have a reflectance value equal to an integer value between zero and 16.

As identified in FIG. 2, the left side of the symbol 53 includes a single dark data cell 66 followed rightward by several adjacent light data cells. The resulting profile produced by the sampling path 62, as shown in FIG. 4, has a valley 166 having a reflectance of less than 20%, followed by a wide peak 188 having a reflectance of greater than 80%, produced by the single dark or black data cell 66 and its several adjacent light or white data cells, respectively. A single light spot 68, to the right of the center pattern, slightly larger than the size of a data cell, produces a high peak in the profile of FIG. 4 having a reflectance greater than 80%.

The sampling path 62 is positioned approximately through the center of the finder pattern, and therefore it crosses the three dark rings 72, 76 and 80, the two light rings 74 and 78 and the center light spot (or virtual hexagonal data cell) 82. As a result, the dark rings 72, 76 and 80 each produce two valleys 72, 76 and 80 that have less than 20% reflectance. Conversely, the light rings 74 and 78 each produce two peaks 174 and 178 in the profile of FIG. 4, all having a reflectance of greater than 80%. The central light spot 82 produces a single peak 182.

After selecting a row of memory cells that correspond to a row of pixels of the stored image, the processor 60 in step 106 analyzes the profile represented by the row of pixels to identify peaks and valleys. A profile can have various waveform topologies, and therefore, a brief analysis of such topologies can be helpful for understanding the present invention.

Figure 6:
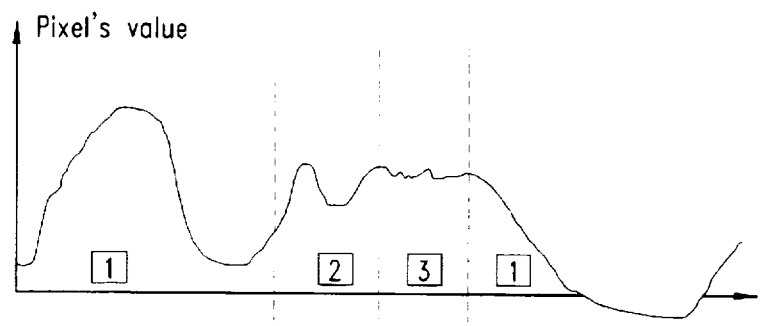
FIG. 6 is an example of a profile having three characteristically different intervals.

Referring to FIG. 6, an example of a profile having three different topologies is shown. In interval "1," the profile has a large peak followed by a large valley. In interval "2," the profile has a small peak followed by a small valley. In interval "3," the profile has several consecutive small ripples. "Ripples" are changes in the profile having a small amplitude and a short duration. Ripples do not represent any useful information in the profile, and must be filtered or eliminated from the profile so as not to be misinterpreted as a peak or valley (which could be falsely interpreted as a space or shape from the symbol 53). As a result, the processor 60 in step 106 identifies four points that represent four portions of a profile that correspond to useful information within the profile.

Figure 7:
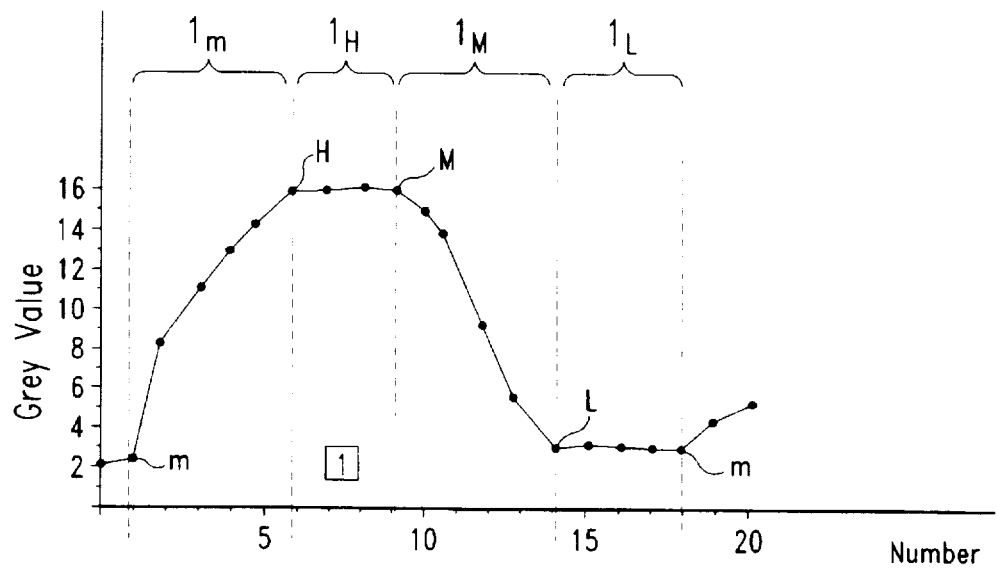
FIG. 7 is an enlargement of a first interval of the profile of FIG. 6 having four different portions that each begin with critical points.

Referring to FIG. 7, interval 1 from the profile of FIG. 6 is shown enlarged to identify four important, information bearing features in the profile. During a first portion $1_m$ of the interval 1, the profile increases from a low reflectivity to a higher reflectivity. The first portion $1_m$ begins at a point "m" that represents the beginning of an increase in reflectivity of the profile. During a second portion $1_H$, the profile remains substantially constant at a high reflectivity. The second portion $1_H$ begins at a point "H" that represents the beginning of a substantially constant high reflectivity. During a third portion $1_M$, the profile decreases from a high reflectivity to a lower reflectivity. The third portion $1_M$ begins at a point "M" that represents the beginning of a decrease in reflectivity in the profile. During a fourth portion $1_L$, the profile remains substantially constant at a low reflectivity. The fourth portion $1_L$ begins at a point "L" that represents the beginning of a substantially constant low reflectivity.

Figures 8A, 8B, 8C:
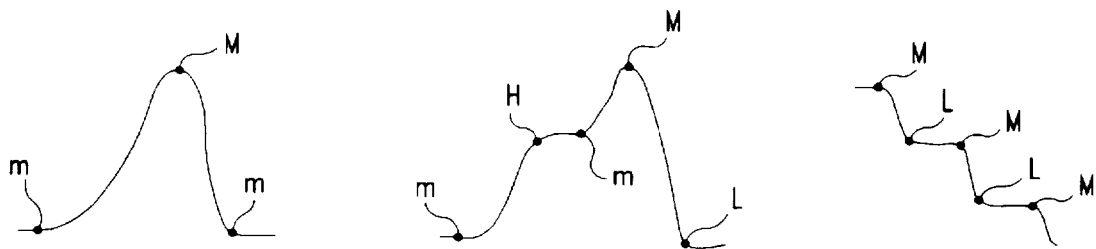
FIGS. 8A, 8B and 8C are examples of portions of a profile showing exemplary critical points.

The points m, H, M, and L represent transitions between the four distinct portions in all profiles and can be referred to as "critical points." Some portions of a profile will have only some of the four critical points, or have various combinations of critical points such as shown in FIGS. 8A, 8B and 8C. As shown in FIG. 8A, a peak represented by the point M lacks a constant high reflectivity, therefore lacks a point H. FIG. 8B shows that a plateau can be formed in the profile, as represented by the point H that is adjacent to two points M (that indicate two separate increases in the reflectivity in a portion of the profile). In FIG. 8C, a stairstep-like portion of a profile can alternate between points M and L as the profile alternately decreases and then remains constant.

As noted above, ripples are small changes in amplitude in a profile, over a short duration. The processor 60 must ignore ripples in the profile. Preferably, for a profile represented by 16 levels of gray (i.e., 16 reflectant values) then ripples can be identified as peaks or valleys in, or changes in the amplitude of, the profile that are less than or equal to two gray scale levels and have a duration of less than two pixels. Of course, a particular threshold for determining what is to be ignored as ripples in a profile, and what is to be considered as a true peak or valley, depends on the optical resolution of the sensor 54, including the number of pixels per unit area, optical resolution, etc.

Mathematically, a row of data from the stored image can be represented as a one-dimensional array of pixel values from an ordered set as follows:

$$D=\{V_i\}, j=1,\ldots,n, \qquad (1)$$

where n is a number of pixels sampled in a given row of the stored image, $V_i$ is the value of a pixel with an ordering number of j (where j is an integer from 1 to n). The value of each pixel is an integer value between 0 and $2^k-1$ where k is the number of resolution bits of the reader 50. In other words, the value of each pixel can be represented by an integer from the following interval:

$$V_j \epsilon [0,\ldots,2^k-1] \qquad (2)$$

As noted above, the present invention preferably has a resolution of 4 bits, which corresponds to 16 levels of gray, and therefore, k is equal to 4.

A preferred subroutine for locating the four critical points m, M, H and L in a given sampling path begins by constructing an array of differences between the values every other two consecutive pixels, based on the array of equation (1) above. The resulting array, G, is as follows:

$$G=\{g_j\}, j=1,\ldots n-1, g_j=V_{j+1}-V_j \qquad (3)$$

Based on the array G of equation (3), the processor 60 in step 106 analyzes each pixel in a given row to identify whether a given pixel is a critical point, and if so, stores that critical point. Therefore, in step 106, the processor 60 identifies the following four characteristic points in the profile: the point "m" where the reflectance of the profile begins to increase (such as a minimum or valley), the point "M" where the reflectance of the profile begins to decrease (such as a maximum or peak), the point "L" where the profile remains approximately constant at a low reflectivity, and the point "H" where the profile remains at an approximately high reflectivity, relative to the point L. In instances where the profile never attains a constant high or low reflectivity, the processor 60 does not locate or identify the points H and L.

An exemplary subroutine, written in pseudocode for the C programming language is presented below. The subroutine identifies the critical points m, M, H and L in a profile represented by a series of pixels despite the presence of ripple, and stores the critical points in an array of critical points "critical_point[ ]. The subroutine begins with an initialization of the variables j=0 and i=0.

INTERVAL_m:

```
if )j>=(n-1))
    go to END_OF_ROUTINE;
if ((g_j==0) && (g_{i+1}>) && (g_{j+2}>0))
    critical_point[i++]=m; j++; go to INTERVAL_H
else if ((g_j==0) && (g_{i+1}>2))
    critical_point[i++]=m; j++; go to INTERVAL_H
else if ((g_j>0) && (g_{i+1}>0))
    critical_point[i++]=m; j++; go to INTERVAL_H
else if ((g_j>2) && (g_{i+1}==0))
    critical_point[i++]=M; j++; go to INTERVAL_L
else if ((g_j<0) && (g_{i+1}<0))
    critical_point[i++]=M; j++; go to INTERVAL_L
else if (g_j<-2) && (g_{i+1}==0))
    critical_point[i++]=M; j++; go to INTERVAL_L
else
```

```
    j++;
INTERVAL_H if (j>=(n-1))
    go to END OF ROUTINE;
if ((g_j=0) && (g_{i+1} <=0) && (g_{j+2}<=0))
    critical_point|i++|=H; j++; go to INTERVAL_M;
else if ((g_j=0) && (g_{i+1} <-2))
    critical_point|i++|=H; j++; go to INTERVAL_M;
else if ((g_j<0) && (g_{i+1} <0))
    critical_point|i++|=M; j++; go to INTERVAL_L;
else if ((g_j<-2) && (g_{i+1} <0))
    critical_point|i++|=M; j++; go to INTERVAL_L;
else
    j++
INTERVAL_M if (j>=(n-1))
    go to END_OF_ROUTINE;
if ((g_j=0) && (g_{i+1}<0) && (g_{j+2}<0))
    critical_point|i++|=M; j++; go to INTERVAL_L
else if ((g_j=0) && (g_{i+1}<-2))
    critical_point|i++|=M; j++; go to INTERVAL_L
else if ((g_j>0) && (g_{i+1}>0))
    critical_point|i++|=m; j++; go to INTERVAL_L
else if ((g_j>2) && (g_{i+1}=0))
    critical_point|i++|=m; j++; go to INTERVAL_L
else if ((g_j<0) && (g_{i+1}<0))
    critical_point|i++|=M; j++; go to INTERVAL_L
else if ((g_j<-2) && (g_{i+1}=0))
    critical_point|i++|=m; j++; go to INTERVAL_L
else
    j++
INTERVAL_L if (j>=(n-1))
    go to END_OF_ROUTINE
if ((g_j=0) && (g_j+ 1>=0) && (g_{j+2}=0))
    critical_point|i++|=L; j++; go to INTERVAL_m
else if ((g_j=0) && (g_{i+1}>2))
    critical_point|i++|=L; j++; go to INTERVAL_m
else if ((g_j>0) && (g_{i+1}>0))
    critical_point|i++|=m; j++; go to INTERVAL_H
else if ((g_j>2) && (g_{i+1}=0))
    critical_point|i++|=m; j++; go to INTERVAL_H
else
    j++
END_OF_ROUTINE;
```

Those skilled in the relevant art will recognize that the above, exemplary subroutine is in turn divided into four subroutines that each identify the four critical points m, H, M, and L, from a series of pixel values taken along a given sampling path. Identified critical points are stored in the array critical_point| |. While the critical points are labeled m, H, M, and L for convenience and ease of understanding herein, they can instead be converted to integer values such as 1, 2, 3 and 4, respectively.

In step 108, the processor 60 first identifies, and then measures distances between, the centers of the peaks and valleys in the profile. For portions of a profile lacking any constant high or low reflectivity intervals (i.e., lacking points H and L), then the point m corresponds to approximately the center of a valley, while the point M corresponds to approximately the center of a peak. Therefore, as shown in FIG. 4, the points m in the valleys 172, 176 and 180 correspond to approximately the centers of those valleys, while the points M in the peaks 174, 178 and 182, correspond to approximately the centers of those peaks.

For peaks and valleys in the profile that have a constant high or low reflectivity, the processor 60 in step 108 identifies a midpoint between the points L and m for a valley and a midpoint between the points H and M for a peak. For example, for the valley 186, the processor 60 locates Cartesian coordinates for the points L and m for the valley, and then using known geometric equations, determines the midpoint between these points. The processor 60, similarly determines a midpoint between the points H and M for the peak 188.

In an alternative embodiment, the present invention in step 108 locates the centers of each peak and valley in the profile by determining the highest or lowest point for a given peak or valley, respectively, by using known methods such as determining when the slope of the profile changes sign (e.g., from positive to negative), or when the amplitude changes from an increasing value to a decreasing value, etc. In a further alternative embodiment, the processor 60 in step 108 determines a mean reflectance value based on the profile. Based on the mean, the processor 60 establishes upper and lower threshold boundaries as a fixed increase and decrease from the mean value, respectively. The processor 60 similarly identifies the two points at which each peak crosses the upper threshold boundary, and then determines the midpoint between these two points. This midpoint thereafter becomes the center for that peak. The processor 60 similarly performs the same steps for all valleys where they cross the lower threshold boundary. Other methods of establishing boundaries and identifying centers of peaks and valleys for profiles is described in more detail in U.S. Pat. No. 5,389,770, entitled "METHOD AND APPARATUS FOR DECODING UNRESOLVED BAR CODE PROFILES," and U.S. patent application Ser. No. 327,972, entitled "METHOD AND APPARATUS FOR DECODING UNRESOLVED MULTI-WIDTH BAR CODE SYMBOLOGY PROFILES."

Importantly, with any method, the processor 60 can locate the centers of the peaks and valleys in the profile despite the presence of printing defects in a symbol such as spots or voids, heavy or light ink spread, low contrast, or other noise, and is thus immune to poor print quality. Additionally, the processor 60 under the routine 100 of the present invention can locate the centers of the peaks and valleys in the profile despite out-of-focus optics, poor resolution optics, poor resolution imaging electronics (e.g., a CCD having fewer pixels), etc.

After identifying the centers of each peak and valley, the processor 60 determines the distances between the centers of identified peaks and valleys, or "center distances" based on the positions of the identified peaks and valleys with respect to an imaginary axis normal to the peaks and valleys (e.g., a line of y=100% reflectance for the profile of FIG. 4). The center distances between the adjacent peaks and valleys are shown along the top of the profile in FIG. 4. The center distances are shown in arbitrary units, and for the present invention, can be a multiple of the quantization used by the processor 60. Alternatively, the units can be a multiple of a rate of a clock coupled to the processor (not shown) or the units can be related to the resolution of the sensor 54.

In step 110, the processor 60 analyzes the series of center distances to attempt to identify a predetermined pattern of center distances that corresponds to a "defined portion" of a symbol for the given symbology that is being decoded, the defined portion being a unique pattern of shapes and spaces particular to that symbology, such as start/stop characters, finder patterns, etc. For the exemplary MaxiCode symbol 53 of FIG. 2, the processor 60 in step 110 attempts to locate a series of eight to ten center distances that are approximately equal that correspond to the center distances between the dark rings 72, 76 and 80, and the light rings 74, 78 and 82 in the bull's-eye finder pattern. As shown in FIG. 4, the center distances for the profile taken along the sampling path 62 include the distances of 4, 5, 4, 5, 4, 6, 6, 5, 4, and 5 which correspond to the center distances between the peaks and valleys 72, 74, 76, 78, 80, 82, 80, 78, 76, 74 and 72, respectively. All of these ten center distances are within about 1 units of each other.

If the processor 60 in step 110 analyzes a string of center distances produced by a given sampling path such as the sampling path 62, and identifies eight to ten adjacent center distances that are approximately equal (e.g., within about ±15% of each other), then the processor 60 determines that it has located the finder pattern for the symbol 53. Furthermore, the inventors have found that the center light spot 82 produces the peak 182 that is higher than the adjacent peaks. As a result, it produces adjacent center distances that are slightly larger than the remaining center distances produced by the finder pattern. Therefore, the processor 60 in step 110 attempts to locate two adjacent center distances that are slightly larger than several adjacent center distances to each side of the two distances. For example, the peak 182 produces the center distances of 6 and 6, which are slightly larger than the typical center distances of 4 and 5 produced by the peaks 174 and 178 and the valleys 172, 176, and 180. The two slightly larger center distances help the processor 60 confirm that it has located the finder pattern for the symbol 53.

Thereafter, in step 114, the processor 60, knowing where the center of the symbol 53 is located within the stored image, begins to locate the six sets of three data cells that correspond to orientation modules for the MaxiCode symbology. Thereafter, the processor 60 decodes the symbol 53 using known decoding techniques.

If the processor 60 in step 110 fails to locate a series of eight substantially equal center distances in the string of center distances generated in step 108, then in step 112, the processor 60 obtains a new digital profile from a newly selected sampling path formed through the symbol 53, and then moves back to step 106. For example, referring to FIG. 2, if the processor 60 initially selected a sampling path 63 through the symbol 53, which does not pass through the center of the finder pattern, then in step 110, the processor 60 would fail to locate the series of eight substantially equal center distances from the string of center distances generated in step 108. Therefore, in step 112, the processor 60 would then select another sampling path through the symbol from the image of the symbol stored in the memory 57 (such as the sampling path 62).

The new sampling path selected in step 112 is preferably proximate to the sampling path initially selected in step 104. For example, if an initial sampling path selected in step 104 is approximately taken from the middle of the stored image, then subsequent sampling paths would be alternately selected above and below the originally selected sampling path, but two rows of pixels away from each other. Therefore, if the initial sampling path were selected as having the Cartesian coordinate of y=300, then the next four selected sampling paths would have the following coordinates: y=298, y=302, y=296, and y=304. The processor 60 repeats the steps of 112, 106, 108, and 110 until the processor locates the series of eight substantially equal center distances, and thereafter performs the step 114. If the processor 60 fails to locate the series of eight substantially equal center distances for a MaxiCode symbol, then the user must create a second stored image of the symbol with the reader 50.

The present invention is generally described above as locating and decoding an exemplary MaxiCode symbol. The present invention, however, can be readily adapted by those skilled in the relevant art, based on the detailed description provided herein, to locate and decode data collection symbols from other symbologies. For example, the present invention can readily locate and decode symbols from the Aztec code symbology with its bull's-eye pattern of concentric square rings. Similarly, the present invention can be adapted to locate and decode symbols from the PDF417 symbology. The processor 60 can attempt to locate very large center distances on opposite sides of a series of a smaller center distances, the large center distances corresponding to the 7-wide and 8-wide bars in the start and stop characters for the PDF417 symbology. The large center distances are in turn adjacent to much larger center distances corresponding to quiet zones on opposite sides of the PDF417 symbol. For linear symbologies, the processor 60 attempts to locate the very large center distances corresponding to quiet zones, which are adjacent to much smaller center distances corresponding to initial bars in the start/stop codes for the linear symbol. Likewise, the present invention can locate and decode other linear, stacked, area symbologies.

Importantly, the routine 100 in steps 106 and 108 locates the centers of peaks and valleys in the profile, and therefore locates the centers of elements in the symbol 53. As a result, in step 114, standard decoding routines can more readily decode the symbol 53 based on distances between the centers of elements, rather than relying on the distances between edges of elements. As explained more fully below, while the edges of elements may shift or become difficult to locate in unresolved profiles using current edge finding circuitry, the centers of the elements remain substantially constant. Therefore, decoding symbols based on the centers of elements, rather than on the edges of the elements, provides a more robust and effective method of decoding symbols.

The routine 100 of the present invention can employ additional subroutines to further enhance locating and decoding of data collection symbols in a stored image. For example, the routine 100 can employ an auto discrimination routine in step 110 that attempts to locate various types of defined portions (e.g., finder patterns and start/stop codes) from the string of center distances to thereby determine from which symbology the symbol was generated. Additionally, the routine 100 can correct for any acceleration or optical distortions that occurred during the generation of the stored image. Autodiscrimination routines and acceleration and optical distortion correction routines are known in the art, and therefore need not be described here.

The routine 100 can also include steps to decode profiles from a symbol where a given profile represents less than all of the bars and spaces or data cells in the symbol for the given sampling path. The shape of the profile produced by the reader 50 depends on the modulated light received from the symbol 53, and also other factors such as the size of the aperture 61 that precedes the light detector in the sensor 54 and whether the symbol 53 is in focus, contains printing defects, or is represented by signals having noise. The profile of FIGS. 4 and 5A show a "resolved" profile, i.e., individual shapes and spaces or data cells in the symbol 53 can be identified by a reader based on high peaks and low valleys in the valley, respectively. Positive ink spread, excessive noise, imaging a symbol out of its depth-of-field, etc. creates a profile that exhibits "closure." Closure in a profile is evidenced by some recognizable peaks and valleys, but also ripples toward the middle of the profile. Wider clusters of adjacent data cells (or wider bars and spaces for typical linear bar code symbols) still produce high peaks and low valleys in the closure profile, but the narrow elements are represented, if at all, by small peaks and valleys or ripples toward the middle of the profile. Current readers are unable to detect individual data cells (or bars and spaces) in such closure profiles.

Figure 9:
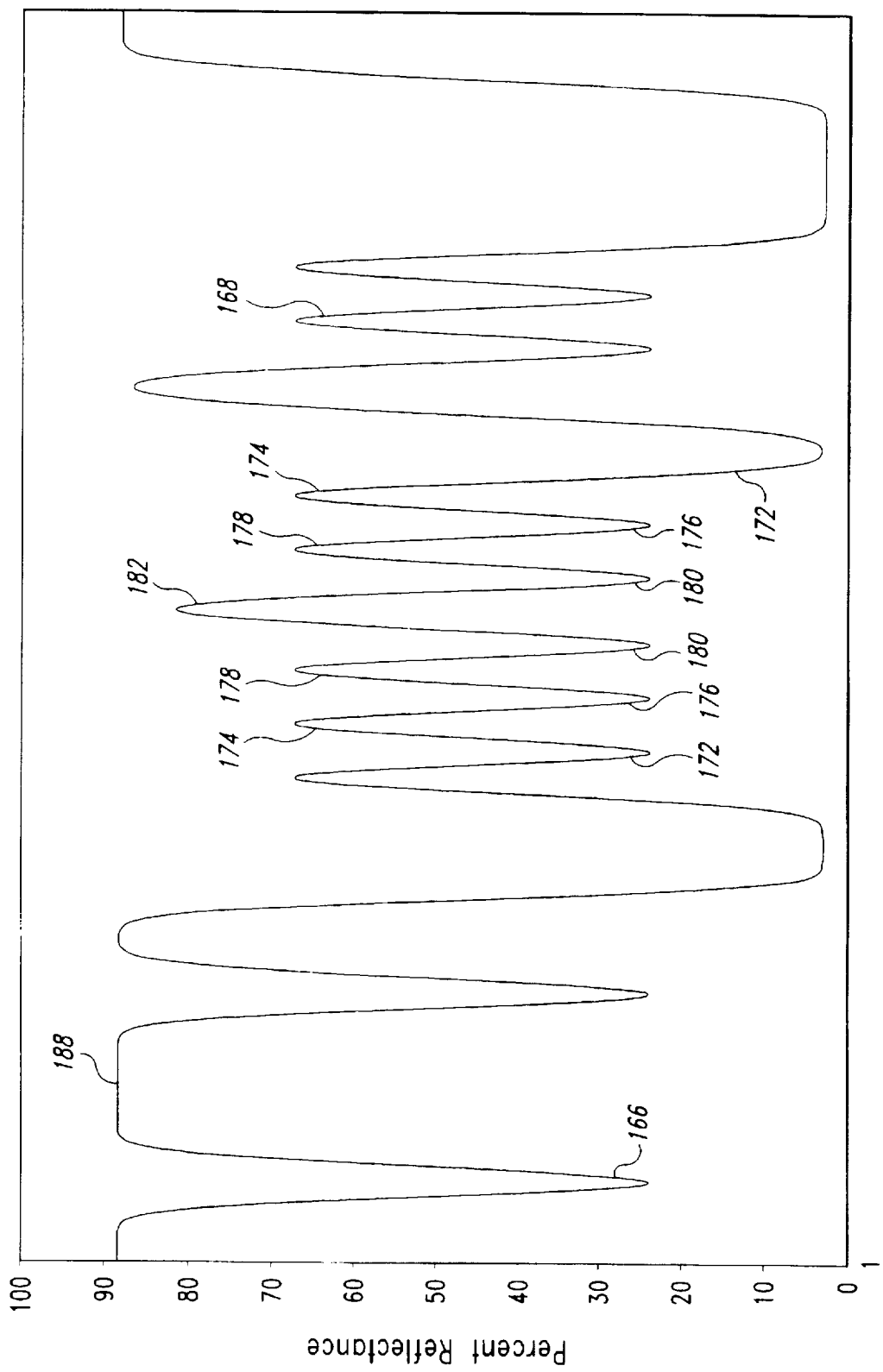
FIG. 9 is an example of a profile of the symbol taken along the sampling path of the symbol of FIG. 2, as produced by the reader of FIG. 1 having an aperture of 1.2 times the X-dimension of the symbol.
Figure 10:
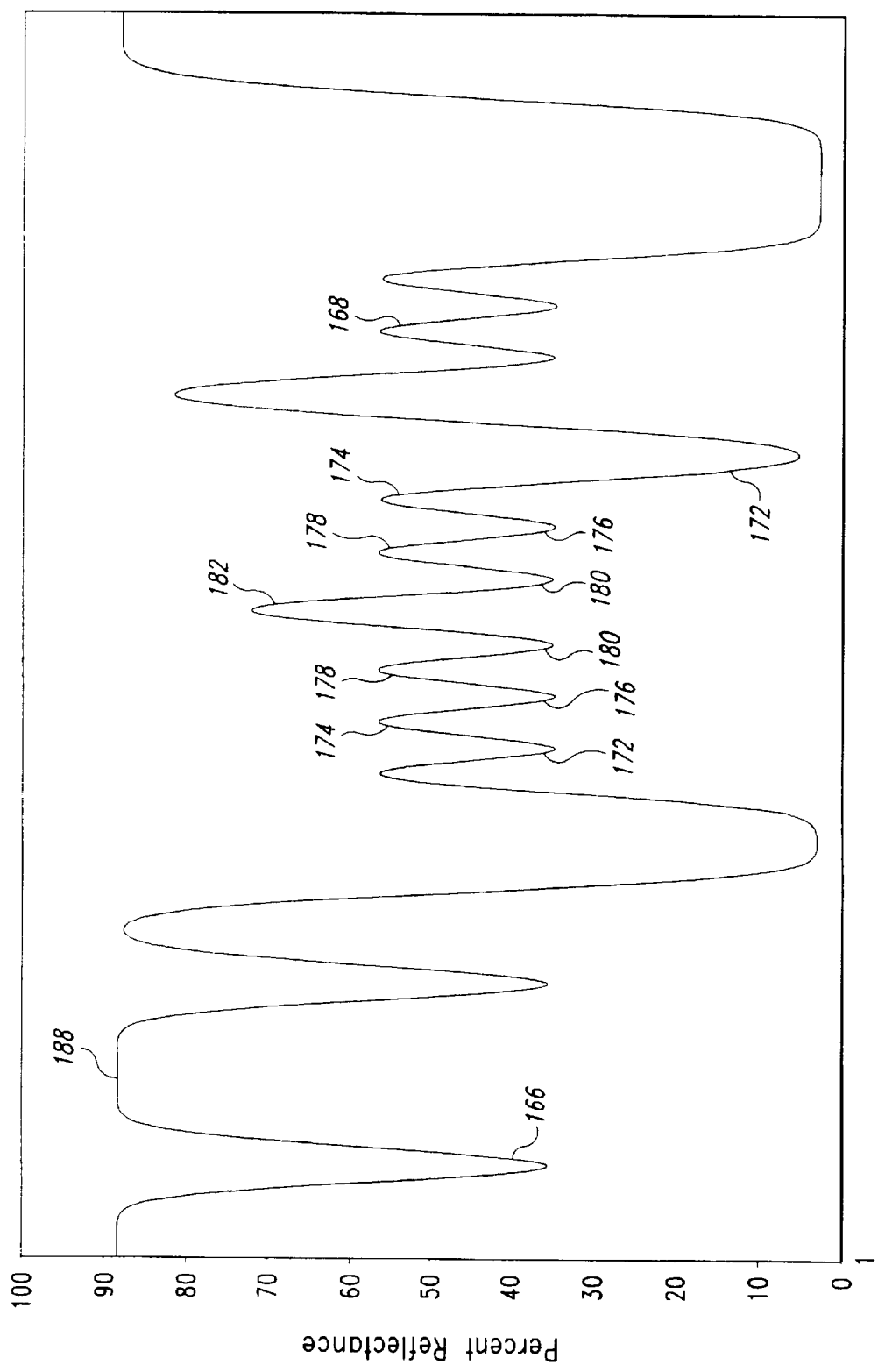
FIG. 10 is an example of a profile of the symbol taken along the sampling path of the symbol of FIG. 2, as produced by the reader of FIG. 1 having an aperture of 1.6 times the X-dimension of the symbol.
Figure 11:
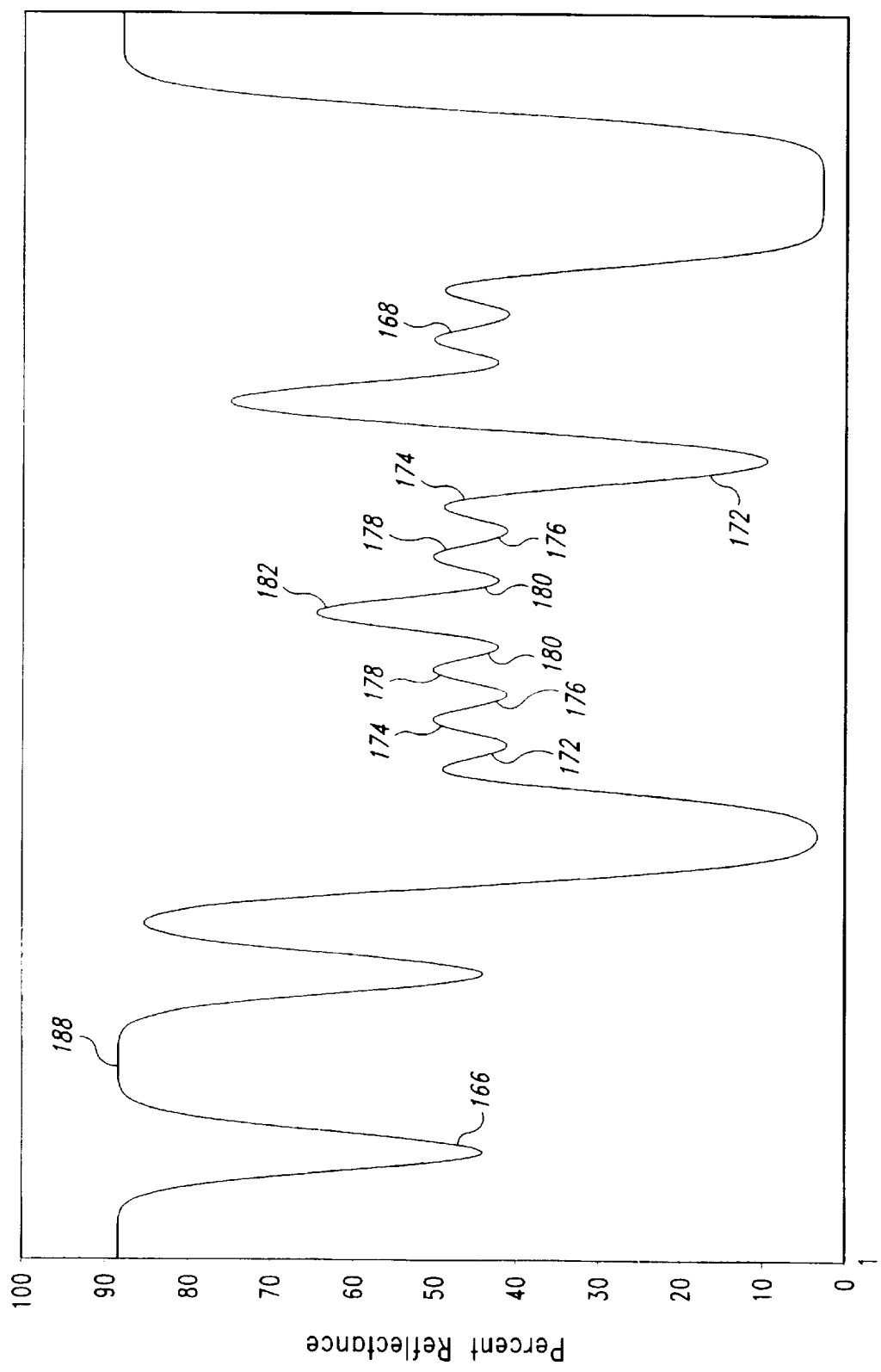
FIG. 11 is an example of a profile of the symbol taken along the sampling path of the symbol of FIG. 2, as produced by the reader of FIG. 1 having an aperture of 2.0 times the X-dimension of the symbol.
Figure 12:
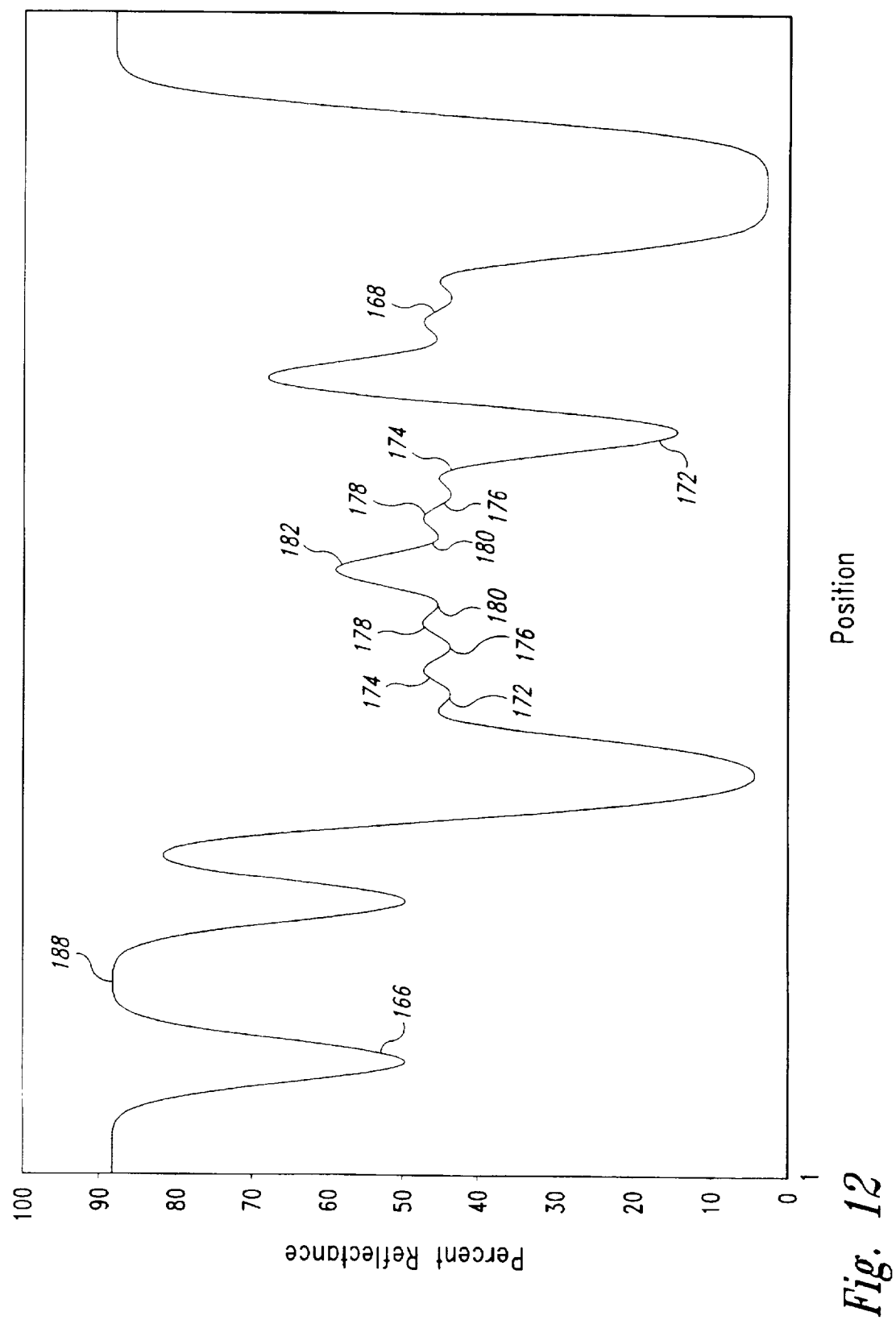
FIG. 12 is an example of a profile of the symbol taken along the sampling path of the symbol of FIG. 2, as produced by the reader of FIG. 1 having an aperture of 2.4 times the X-dimension of the symbol.
Figure 13:
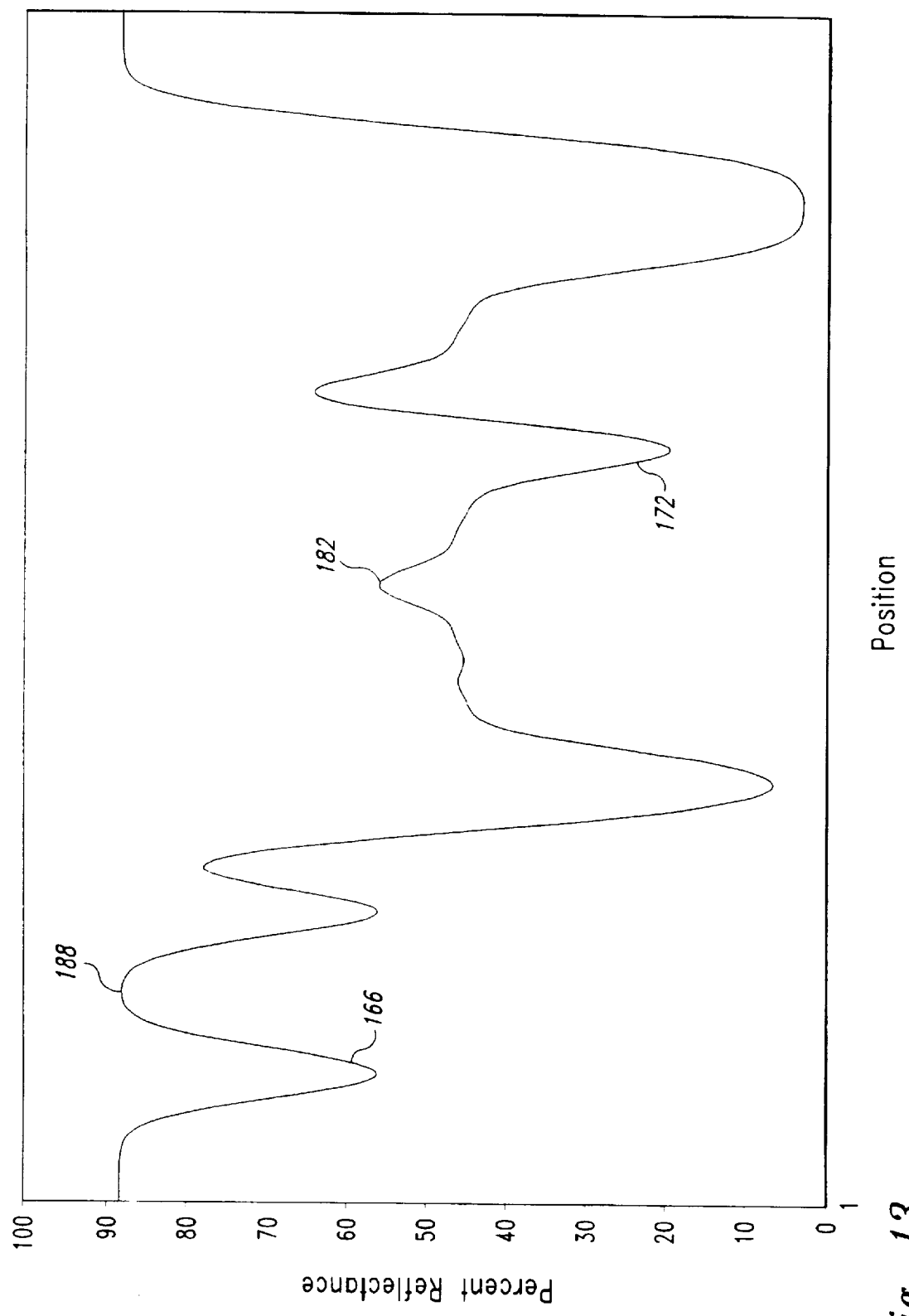
FIG. 13 is an example of a profile of the symbol taken along the sampling path of the symbol of FIG. 2, as produced by the reader of FIG. 1 having an aperture of 2.8 times the X-dimension of the symbol.

FIGS. 9 through 13 illustrate how individual data cells in the symbol 53, or narrow elements in a typical linear bar code, become unresolved or "lost" in profiles as the aperture of 61 and the sensor 54 increases from 1.2X to 2.8X. By locating the transitions from valleys to peaks in the resolved profile of FIGS. 4 or 5, standard decoding circuitry can identify the edges of each of the elements in the profile and thereby decode the profile. However, the profiles of FIGS. 12 and 13 are undecodable using such circuits (the profile of FIGS. 9 through 11 are possibly decodable).

Figure 14:
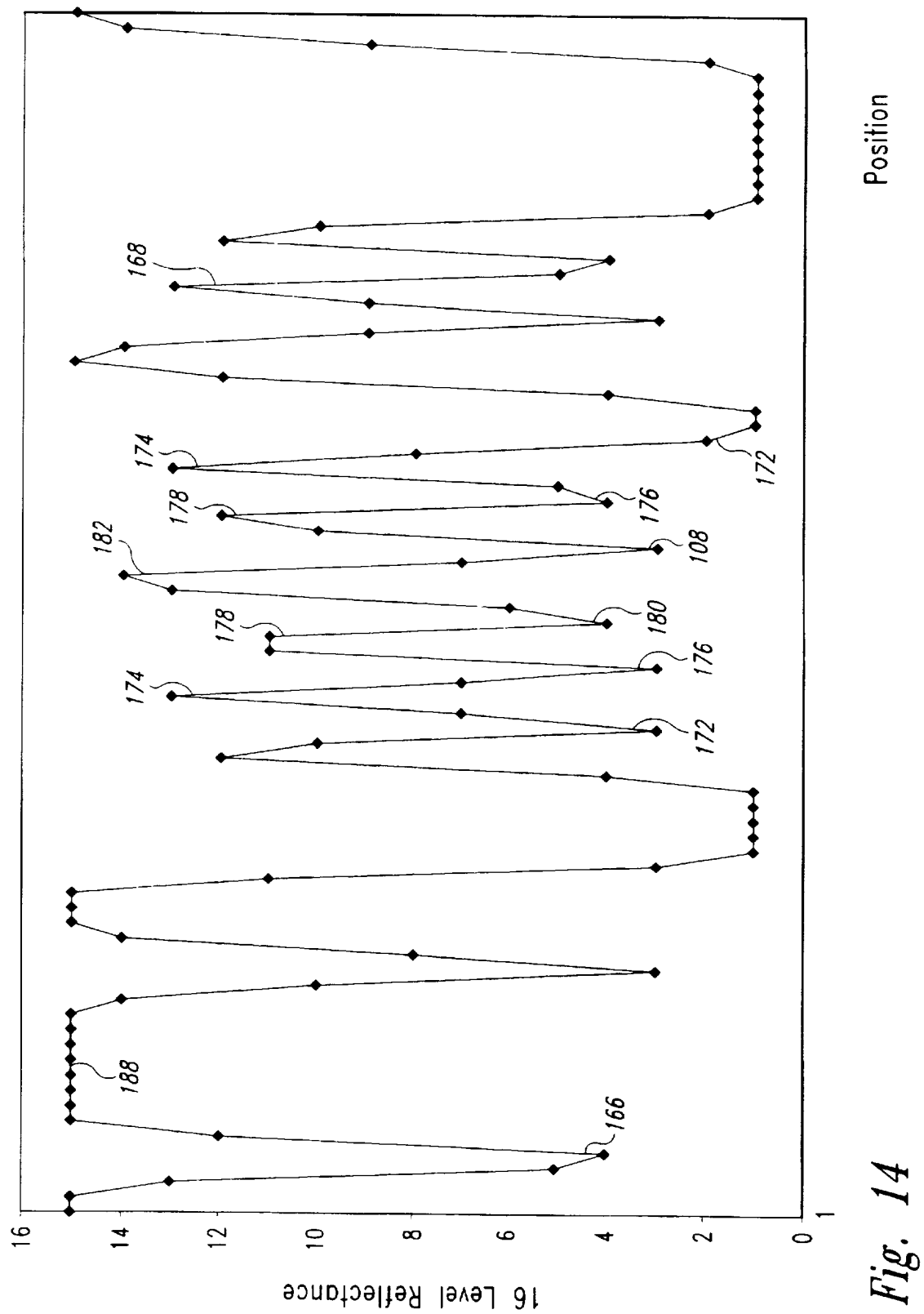
FIG. 14 is an example of a profile of the symbol taken along the sampling path of the symbol of FIG. 2, as produced by the reader of FIG. 1 having an aperture of approximately 0.8 times the X-dimension of the symbol that is based on a conversion to 16 levels of gray and a resolution of 1.6 pixels per module for the symbol.
Figure 15:
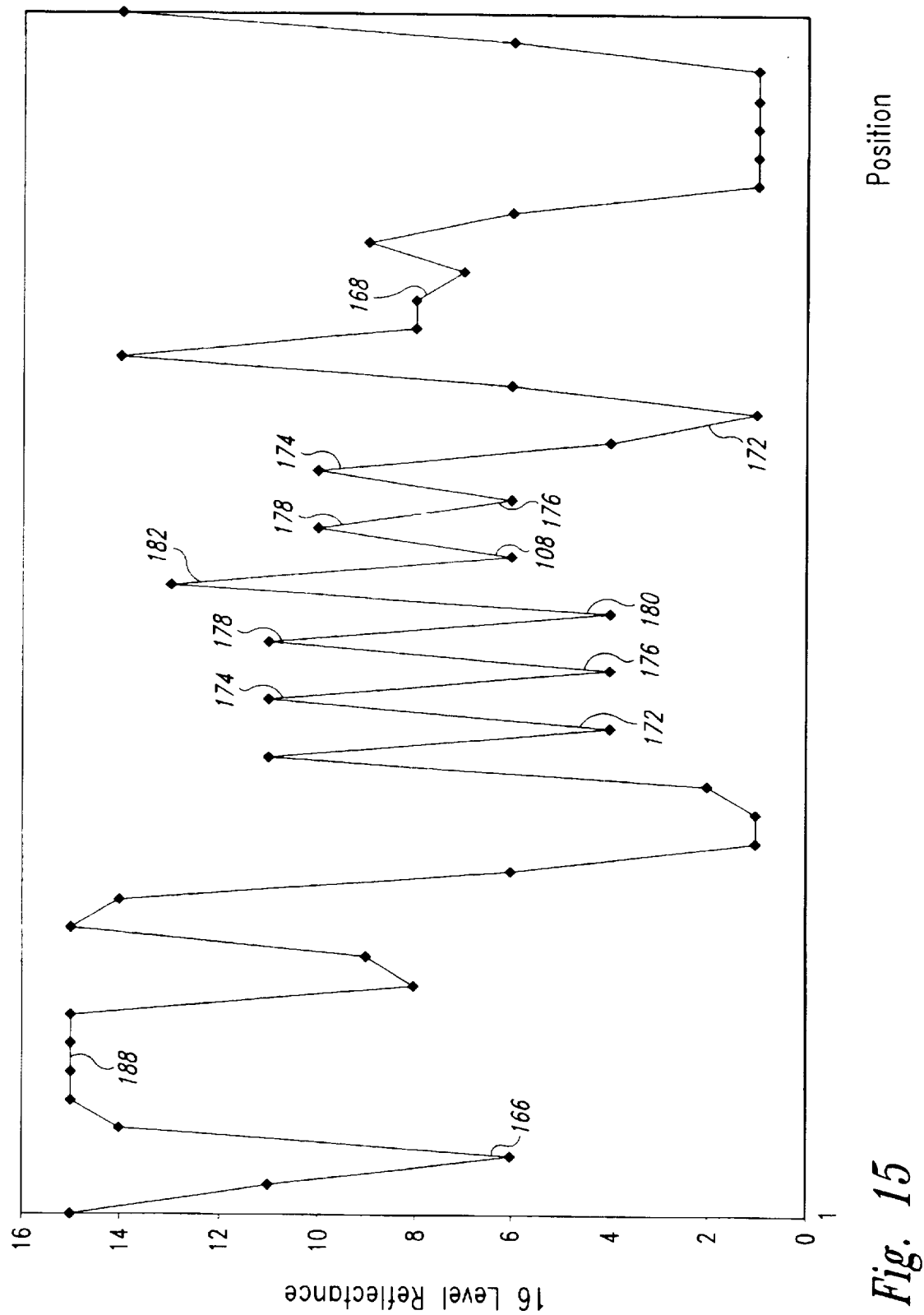
FIG. 15 is an example of a profile of the symbol taken along the sampling path of the symbol of FIG. 2, as produced by the reader of FIG. 1 having an aperture of approximately 0.8 times the X-dimension of the symbol that is based on a conversion to 16 levels of gray and a resolution of 0.8 pixels per module for the symbol.

The profiles in FIGS. 9 through 13 can also be used to demonstrate profiles that would be produced by the reader 50 having a fixed aperture 61 of 0.8X, but where the profiles are generated as the reader moves from an in-focus distance (FIG. 4 or 5) to a significantly out-of-focus distance (FIG. 13) for the symbol 53. Additionally, the profiles shown in FIGS. 9 through 13 may also be used to demonstrate an out-of-focus laser scanner or wand, or a CCD-type reader having too few pixels in its CCD array to adequately resolve a given symbol. The profiles of FIGS. 14 and 15 more accurately show how the profiles become distorted as the number of pixels used to image a sampling path are reduced. Therefore, comparing the profiles of FIGS. 5A, 14, and 15, as the beta for the reader 50 changes from 2.4 to 1.6 to 0.8 respectively, the profile similarly becomes unresolved.

Under the routine 100 of the present invention, the finder pattern or defined portion of the symbol 53 can be located, even with a slightly unresolved profile. As can be seen by comparing the profiles of FIG. 4 to the profiles of FIGS. 9–13, as the profiles become less resolved, the peaks and valleys 172, 174, 176, 178, 180 and 182 tend to move toward a middle, gray reflectance of about 50%. The peaks and valleys of the finder pattern, however, still remain equally spaced apart, and the center distances therebetween have substantially equal values. In other words, the positions of all of the peaks and valleys remain effectively constant as the aperture 61 in the reader 50 increases. As a result, the routine 100 of the present invention can still identify the centers of recognizable peaks and valleys in the profile (up to about an aperture of 2.4 for FIG. 12 with a high resolution reader) and still locate the finder pattern for the symbol 53. Importantly, the center high peak 182 produced by the white spot 82 remains resolved while the adjacent peaks and valleys become unresolved, and thus the present invention can locate the center peak without positively identifying the adjacent peaks and valleys for the center finder pattern. As a result, the routine 100 of the present invention provides a robust method of locating a finder pattern, despite out-of-focus optics, printing defects, etc.

The routine 100 can also include additional subroutines to locate and decode unresolved profiles formed from or through the symbol 53, even though individual data cells are unresolved. The co-inventor's previously identified U.S. patent and application describe a preferred subroutine that can be employed by the routine 100 of the present invention to decode unresolved profiles. The co-inventor's U.S. patent and application describe how a microprocessor identifies the higher peaks and lower valleys in the digitized profile, bounds the peaks and valleys as resolved elements, and identifies potential wide elements (e.g., 2-wide bars and spaces for a liner symbology such as Code 39). The microprocessor verifies the wide elements and then measures distances between these wide elements. The processor analyzes the profile and the measured distances, including start and stop characters, to determine a unit distance or X-dimension for the profile. Based on the unit distance, the microprocessor constructs a matrix for determining the number of narrow elements unresolved or "lost" between resolved wide elements. Based on the measured distances between resolved elements, all of the unresolved narrow elements are identified and the profile is subsequently decoded.

Therefore, in an alternative embodiment of the present invention, the routine 100 can be modified to include additional steps following step 114 that are performed if the reader 50 cannot decode a given symbol after having located its defined portion. Therefore, the routine 100 can determine a unit distance for a given data cell, or narrow-width bar or space, construct a lost element matrix, and thereby attempt to decode the symbol using the method and apparatus described in the co-inventor's previously described patent and application.

While the present invention has been described above with respect to a method performed by the processor 60, the routine 100 can be implemented using appropriate circuitry. As shown in FIG. 13, a reader 200 includes the light source 52, sensor 54, and converter/receiver 56 as described above. A detection circuit 210 receives the profile produced by the converter/receiver 56 and detects for the minimum and maximum points of peaks and valleys in the profile. The detection circuit 210 locates the approximate centers of peaks and valleys by locating the minimum and maximum points in the profile, as described above for step 106 of the routine 100.

A measuring circuit 212 receives an output signal from the detection circuit 210 and measures the center distances between peaks and valleys in the profile (as in step 108). The detection circuit 210, for example, can employ known wave shaping circuits while the measuring circuit 212 can include known counter circuits that operate in conjunction with wave shaping circuits in many bar code readers. A slope detection/threshold circuit 214 can be used in addition to, or in lieu of, the detection circuit 210 to locate the centers of peaks and valleys in the profile. The slope detection/ threshold circuit 214 may operate with, or in lieu of, the detection circuit 210 to establish upper and lower threshold boundaries to more accurately locate the centers of peaks and valleys, as described above.

A decoding circuit 216 receives output signals from the measuring circuit 212 and/or the slope detection/threshold circuit 214 to attempt to decode the profile. The decoding circuit 216 essentially performs the steps of 110 and 114 of the routine 100. Of course, a microprocessor can be substituted for one or all of the circuits 210, 212, 214, and 216.

The present invention is, at times, described above graphically for ease of presentation and understanding. Those skilled in the art will recognize that the reader 50 of the present invention preferably does not graphically analyze and decode a given profile, but instead analyzes the values of individual pixel elements stored in the memory 57. While the present invention is described above as "measuring," the present invention preferably calculates the center distances in the profile by interpolating with respect to identified points in the profile, particularly when a finite number of pixels are used to generate the profile. Accordingly, it can be appreciated by those skilled in the art that various equivalent modifications of the above-described embodiments may be made without departing from the spirit and scope of the invention. Therefore, the present invention is limited only by the following claims.

We claim:

1. A method of locating within a two-dimensional stored image and decoding a machine-readable symbol representing encoded information in two-dimensions, the symbol including a plurality of selectively spaced two-dimensional geometric shapes, the shapes and spaces between the shapes having at least a first width in at least one dimension, the symbol having a predetermined location pattern of shapes and spaces identifying the symbol, the method comprising the steps of:

producing a reflectance signal from the two-dimensional stored image based on light reflected from the symbol, the reflectance signal having valleys and peaks that represent the reflectance of the shapes and spaces, respectively, comprising the symbol, the signal including a regular series of peaks and valleys corresponding to the predetermined location pattern;

identifying a plurality of portions in the reflectance signal that correspond to the valleys and peaks of the shapes and spaces;

measuring distances between the plurality of portions in the reflectance signal, including an approximately regular series of measured distances corresponding to the regular series of peaks and valleys;

identifying the predetermined location pattern based on the approximately regular series of measured distances in the reflectance signal;

determining a location orientation of the symbol based on the identified predetermined location pattern; and decoding the information encoded in the symbol based on the location of the symbol.

2. The method of claim 1 wherein the step of producing a reflectance signal includes the step of producing the reflectance signal as a multiple level digital signal.

3. The method of claim 1 wherein the step of identifying a plurality of portions in the reflectance signal includes the steps of finding minimum and maximum points in the reflectance signal that correspond to the valleys and peaks, respectively.

4. The method of claim 1 wherein the shapes in the symbol represent low reflectivity, while the spaces in the symbol represent high reflectivity relative to the shapes, and wherein the step of identifying a plurality of portions in the reflectance signal includes the steps of finding points in the reflectance signal where the reflectance signal indicates that reflectivity increases, where the reflectance signal indicates that reflectivity decreases, where the reflectance signal indicates a portion of substantially constant high reflectivity, and where the reflectance signal indicates a portion of substantially constant low reflectivity.

5. The method of claim 1 wherein the step of measuring distances with respect to the plurality of portions in the reflectance signal measures distances between centers of the valleys and peaks in the reflectance signal.

6. The method of claim 1 wherein the step of measuring distances includes the steps of:

identifying a center for each of the plurality of portions;

selecting a first portion and an adjacent second portion from the plurality of portions;

measuring a distance between the centers of the first and second portions; and, repeating the steps of selecting and measuring until all distances between the plurality of portions have been measured.

7. The method of claim 1 wherein the step of determining the location of the symbol includes the steps of:

identifying at least one predetermined set of shapes and spaces; and determining an orientation of the symbol based on a position of the predetermined set of shapes and spaces with respect to the predetermined location pattern.

8. The method of claim 1 wherein the predetermined location pattern is a plurality of concentric shapes and spaces, and wherein the step of identifying the predetermined location pattern includes the step of locating a selected pattern of substantially equal measured distances.

9. The method of claim 1 wherein the symbol is a bar code symbol, wherein the predetermined location pattern is one of a start and stop code for the bar code symbol, and wherein the step of identifying the predetermined location pattern includes the step of locating a large measured distance corresponding to a quiet zone, and locating a smaller measured distance, relative to the large measured distance, corresponding to a shape in the symbol adjacent to the quiet zone.

10. The method of claim 1 wherein the step identifying the predetermined location pattern includes the step of locating a selected pattern of measured distances.

11. The method of claim 1 wherein the step of measuring distances with respect to the plurality of portions in the reflectance signal measures distances between centers of the valleys and peaks in the reflectance signal to produce a series of center distances based on the reflectance signal, and wherein the step identifying the predetermined location pattern includes the step of locating a repeating pattern of approximately similar center distances within the series of center distances.

12. The method of claim 1, further comprising the step of producing a stored image of the symbol; and wherein the step of producing a reflectance signal produces a sampling path through the stored image.

13. The method of claim 1, further comprising the steps of:

determining that the predetermined location pattern has not been identified in the reflectance signal;

producing another reflectance signal based on light reflected from a portion of the symbol that differs from a portion of the symbol that previously produced the reflectance signal; and repeating the steps of producing another reflectance signal, identifying a plurality of portions, measuring, and identifying the predetermined location pattern until the predetermined location pattern is identified in the symbol.

14. A method of locating a data collection symbol representing encoded information, the symbol including a plurality of spaced two-dimensional shapes and having a selected pattern of shapes and spaces between the shapes, the method comprising the steps of:

receiving a signal based on light reflected from the symbol, the signal representing a reflectance of at least some of the shapes and spaces of the symbol, wherein the shapes and spaces of the symbol represent information encoded in two dimensions;

identifying a plurality of portions in the signal that correspond to at least portions of the shapes and spaces represented in the signal;

measuring distances between the plurality of portions in the signal including a selected pattern of measurements;

identifying the selected pattern based on the measured selected pattern of measurements in the signal; and determining a location of the symbol based on the identified selected pattern.

15. The method of claim 14 of wherein the step of identifying a plurality of portions in the signal includes the step of finding minimum and maximum points in the signal that correspond to peaks and valleys in the signal.

16. The method of claim 14 wherein the step of measuring distances between the plurality of portions in the signal measures distances between centers of peaks and valleys in the signal.

17. The method of claim 14 wherein the step of identifying the selected pattern includes the step of locating a series of substantially equal measured distances.

18. The method of claim 14 wherein the step of identifying a plurality of portions in the signal includes the step of filtering noise from the signal.

19. An apparatus for locating a machine-readable symbol representing encoded information in two-dimensions, the machine-readable symbol including a plurality of selectively spaced two-dimensional shapes, and having a selected pattern of shapes and spaces between the shapes, the apparatus comprising:

a sensor that receives light that is reflected from the machine-readable symbol and produces an output signal therefrom that represents the reflectance of the shapes and spaces comprising the symbol;

a receiver that receives the output signal and produces a reflectance signal indicative of at least some of the shapes and spaces; and a processor for processing the reflectance signal and producing a signal indicative of the information encoded in the symbol, the processor (i) identifying a plurality of portions in the reflectance signal that correspond to at least portions of the shapes and spaces, (ii) measuring distances between the plurality of portions in the reflectance signal, including an approximately regular series of measured distances, (iii) identifying the selected pattern based on the regular series of measured distances in the reflectance signal, and (iv) determining a location of the symbol based on the identified selected pattern.

20. The apparatus of claim 19 wherein the processor measures distances by identifying a center for each of the plurality of portions in the reflectance signal and measuring distances between the centers of the plurality of portions.

21. The apparatus of claim 19 wherein the processor defines at least one threshold with respect to the plurality of portions in, the reflectance signal identifies a center for each of the plurality of portions at the threshold and measures a distance between the center of each of the plurality of portions.

22. The apparatus of claim 19 wherein the processor identifies the plurality of portions in the reflectance signal by, in part, finding minimum and maximum points that correspond to valleys and peaks, respectively, the reflectance signal.

23. The apparatus of claim 19 wherein the processor identifies the selected pattern by identifying a predetermined number of substantially equal measured distances.

24. An apparatus for locating and decoding a machine-readable symbol representing encoded information in two-dimensions, the machine-readable symbol including a plurality of selectively spaced two-dimensional shapes, and having a selected pattern of shapes and spaces between the shapes, the apparatus comprising:

a sensor that receives light that is reflected from the machine-readable symbol and produces an output signal therefrom that represents the reflectance of the shapes and spaces comprising the symbol;

a receiver that receives the output signal and produces a reflectance signal indicative of at least some of the shapes and spaces;

a detection circuit that identifies a plurality of portions in the reflection signal that correspond to portions of at least some of the shapes and spaces, including an approximately regular series of measured distances;

a measuring circuit that generates a distance signal indicating distances between the plurality of portions in the reflectance signal; and a decoding circuit that identifies a location of the selected pattern in the machine-readable symbol based on the distance signal, including the regular series of measured distances, and therefrom produces a signal indicative of the information encoded in the machine-readable symbol.

* * * * *